United States Patent
Petruzzelli

(10) Patent No.: US 10,034,030 B2
(45) Date of Patent: Jul. 24, 2018

(54) FIELD-PROGRAMMABLE LOW-NOISE BLOCK DOWNCONVERTER

(71) Applicant: DISH Technologies L.L.C., Englewood, CO (US)

(72) Inventor: Edmund Petruzzelli, Centennial, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 952 days.

(21) Appl. No.: 14/034,912

(22) Filed: Sep. 24, 2013

(65) Prior Publication Data

US 2015/0089548 A1    Mar. 26, 2015

(51) Int. Cl.
| | | |
|---|---|---|
| H04N 7/20 | (2006.01) | |
| H04N 21/2343 | (2011.01) | |
| H04H 40/90 | (2008.01) | |
| H04N 21/238 | (2011.01) | |
| H04N 21/2385 | (2011.01) | |
| H04N 21/438 | (2011.01) | |
| H04N 21/61 | (2011.01) | |

(52) U.S. Cl.
CPC ........ *H04N 21/2343* (2013.01); *H04H 40/90* (2013.01); *H04N 21/238* (2013.01); *H04N 21/2385* (2013.01); *H04N 21/438* (2013.01); *H04N 21/6143* (2013.01)

(58) Field of Classification Search
CPC .......... H04N 21/2343; H04N 21/6143; H04N 21/438; H04N 21/238; H04N 21/2385
USPC ......................................................... 725/68
See application file for complete search history.

(56) References Cited

U.S. PATENT DOCUMENTS

| | | | | |
|---|---|---|---|---|
| 5,835,128 A | * | 11/1998 | Macdonald | H04N 7/20 348/E7.093 |
| 6,430,233 B1 | | 8/2002 | Dillon et al. | |
| 6,493,873 B1 | * | 12/2002 | Williams | H04H 20/63 375/E7.002 |
| 6,622,307 B1 | * | 9/2003 | Ho | H04N 7/104 348/E7.05 |
| 6,704,549 B1 | | 3/2004 | Sorrells et al. | |
| 6,785,656 B2 | | 8/2004 | Patsiokas et al. | |
| 6,868,255 B1 | | 3/2005 | Chanteau et al. | |
| 6,947,702 B2 | * | 9/2005 | Green, Sr. | H04H 20/63 348/E7.05 |
| 7,260,356 B2 | | 8/2007 | Helstrom et al. | |
| 7,271,640 B2 | | 9/2007 | Bargroff | |
| 7,394,806 B2 | | 7/2008 | Beshai et al. | |
| 7,502,587 B2 | | 3/2009 | Petruzzelli | |
| 7,522,875 B1 | * | 4/2009 | Gurantz | H04H 40/90 455/179.1 |
| 2002/0175998 A1 | | 11/2002 | Hoang | |

(Continued)

OTHER PUBLICATIONS

European Search Report for EP14183582, dated Nov. 10, 2014. 6 pages.

*Primary Examiner* — Pankaj Kumar
*Assistant Examiner* — Sahar Baig
(74) *Attorney, Agent, or Firm* — Kilpatrick Townsend & Stockton LLP

(57) ABSTRACT

A field-programmable low-noise block downconverter. The low-noise block downconverter may, as part of a system install or upgrade for example, be programmed in the field to source channels containing programming to a particular television receiver based on the particular configuration of the receiver.

20 Claims, 8 Drawing Sheets

(56) References Cited

U.S. PATENT DOCUMENTS

| | | |
|---|---|---|
| 2002/0191105 A1 | 12/2002 | Walters |
| 2003/0058810 A1 | 3/2003 | Petronic |
| 2003/0212999 A1 | 11/2003 | Cai |
| 2003/0217362 A1* | 11/2003 | Summers ............... H04H 20/42 725/63 |
| 2004/0209584 A1 | 10/2004 | Bargroff et al. |
| 2004/0214537 A1 | 10/2004 | Bargroff et al. |
| 2005/0005296 A1 | 1/2005 | Bargroff et al. |
| 2005/0013584 A1 | 1/2005 | Takaoka et al. |
| 2005/0081245 A1 | 4/2005 | Arad et al. |
| 2005/0155082 A1 | 7/2005 | Weinstein et al. |
| 2005/0169255 A1 | 8/2005 | Shimomura et al. |
| 2005/0179487 A1 | 8/2005 | Lee et al. |
| 2005/0193419 A1 | 9/2005 | Lindstrom et al. |
| 2006/0031375 A1 | 2/2006 | Danker et al. |
| 2006/0048197 A1 | 3/2006 | Petruzzelli |
| 2007/0087712 A1 | 4/2007 | Bargroff et al. |
| 2007/0110439 A1 | 5/2007 | Beshai et al. |
| 2007/0111661 A1 | 5/2007 | Bargroff et al. |
| 2007/0141982 A1 | 6/2007 | Bargroff et al. |
| 2007/0143793 A1 | 6/2007 | Barrett et al. |
| 2008/0163286 A1 | 7/2008 | Rudolph et al. |

\* cited by examiner

FIELD-PROGRAMMABLE LOW-NOISE BLOCK DOWNCONVERTER

SUMMARY

This Summary does not in any way limit the scope of the claimed subject matter.

In an aspect, a method for programmatically configuring a low-noise block downconverter (LNB) is disclosed. The method may include or comprise identifying a particular configuration of at least one receiver coupled to the LNB. The method may include or comprise accessing, based on the identifying, a particular file containing instructions to configure the LNB so that output signals provided by the LNB to the at least one receiver are formatted according to the particular configuration of the at least one receiver. The method may include or comprise modifying logic of the LNB based on the instructions so that output signals provided by the LNB to the at least one receiver are formatted according to the particular configuration of the at least one receiver.

In an aspect, a computer-implemented method is disclosed. The method may include or comprise receiving a command to reprogram a block downconverter from a first mode to a second different mode so that the block downconverter is reconfigured to output signals to a television receiver formatted according to at least one particular configuration of the television receiver. The method may include or comprise modifying one or more logical modules of the block downconverter from a first configuration to a second different configuration so that output signals provided by the block downconverter to the television receiver are formatted according to the at least one particular configuration of the television receiver. The method may include or comprise outputting signals from the block downconverter to the television receiver formatted according to the at least one particular configuration of the television receiver.

In an aspect, a low-noise block downconverter is disclosed. The low-noise block downconverter may include or comprise at least one input module configured to include a plurality of input ports each communicatively coupleable to a feedhorn to receive as input signals broadcast by a particular satellite. The low-noise block downconverter may include or comprise at least one output module coupled to the input stage and configured to include a plurality of output ports each communicatively coupleable to a particular television receiver to supply as output signals in accordance with a particular television receiver configuration. The low-noise block downconverter may include or comprise at least one controller coupled to at least the output module and configured to receive a command to program the output module so that output signals supplied to each plurality of output ports are formatted according to a particular configuration of a respective television receiver coupled thereto.

DETAILED DESCRIPTION

Figure 1:
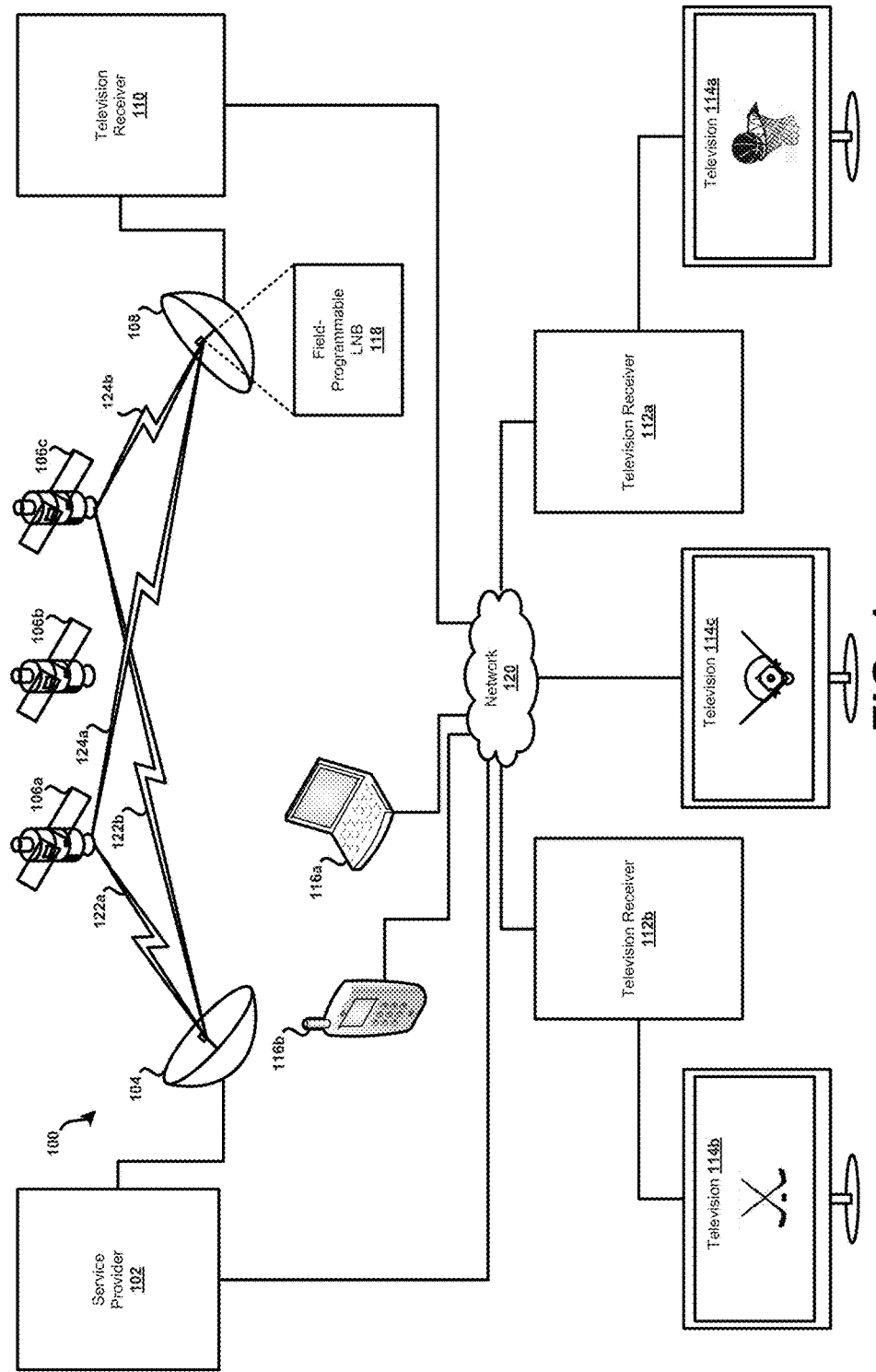
FIG. 1 shows an example satellite system in accordance with the present disclosure.

An ODU (Outdoor Satellite Unit) in a satellite television implementation may refer to equipment located outside of a particular building, as opposed to one or more receivers located within the building, and may at least include a satellite dish and LNB (Low-Noise Block Downconverter). In one example, a particular LNB may be mounted to or integrated with a feedhorn that is coupled to a particular satellite dish, but may include multiple RF (Radio Frequency) inputs or probes and multiple RF outputs or ports. In this example, multiple RF probes may operate independently from each other, and each may detect or receive incoming signals that are broadcast from multiple different satellites. The multiple RF outputs too may be independent from each other, and each respective output may be coupled to a particular receiver via a coaxial cable, sometimes referred to as a "cable drop," to source channels containing programming to the receiver. In practice, the LNB may amplify and convert incoming satellite signals to an intermediate frequency band, such as L-Band or S-Band for example, for transmission across the coaxial cable to the receiver. Further, in a multi-tuner receiver implementation, the LNB may process the incoming satellite signals so that the LNB may source channels containing programming to the receiver according to a specific sourcing scheme that is implementation-specific.

For example, a particular LNB may be "band-translation-enabled" so that the LNB may source channels containing programming to a particular multi-tuner receiver that is also band-translation-enabled. Such an implementation or technique is described in U.S. Pat. No. 7,502,587, the entirety of which is hereby incorporated by reference. A band-translation implementation may be beneficial at least because an appropriately configured LNB may select at least two frequency bands from any combination of satellites and dishes, and stack and send those bands on a single coaxial cable to a particular multi-tuner receiver for further processing. In many instances, a single cable drop may be desirable at least for aesthetic and possibly practical reasons. Other schemes are possible as well, as discussed in further detail below.

As a general matter, this disclosure may use the term "signal." A signal may be any digital or analog signal. Those signals may include, but are not limited to, at least one of a bit, a specified set of bits, an A/C signal, or a D/C signal. Uses of the term "signal" may include any of these different interpretations. Further, satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CSPAN®, ABC®, CBS®, ESPN®, etc. Further, the term "channel," may carry a different meaning from its normal connotation. The term "channel" may denote a particular carrier frequency or "sub-band" which can be tuned to by an appropriate tuner. The term "channel" may not refer to a single program/content service such as HBO®, CSPAN®, etc. Similarly, "tuning" may refer to receiving a channel having multiple services thereon. A single satellite may typically have multiple transponders (e.g., 32 transponders) each one broadcasting a channel or band of about 24-27 MHz in a broader frequency "band" of about 500 MHz. Thus, a band of about 500 MHz may contain numerous sub-bands or channels of about 24-27 MHz, and each channel in turn may carry a combined stream of digital data comprising a number of content services.

In accordance with this and other contexts, the present disclosure is directed to or towards a field-programmable LNB. It is contemplated that the LNB as described throughout may represent a paradigm shift with respect to LNB design. This is because a specific LNB sourcing scheme, as briefly mentioned above, is typically implemented in or as hardware, and thus as receiver technology evolves and new systems are replaced it may also be necessary to replace a particular LNB. This might be a relatively expensive proposition and may, for example, serve as an entry barrier for new or existing customers. In contrast, the LNB of the present disclosure may, as part of a system install or upgrade, be programmed or reprogrammed in the field to source channels containing programming to a particular television receiver based on the particular configuration of the receiver. This may be a relatively inexpensive procedure in comparison to LNB replacement, and thus may at least be marketed as a selling point to new or existing customers who might be considering receiver upgrade. Although not so limited, an appreciation of the various aspects of the present disclosure may be gained from the following discussion in connection with the drawings.

For instance, referring now to FIG. 1, an example satellite system 100 is shown in accordance with the present disclosure. For brevity, the satellite system 100 is depicted in a simplified form, and may generally include more or fewer systems, devices, networks, and/or other components as desired. Further, number and type of features or elements incorporated within the satellite system 100 may or may not be implementation-specific, and at least some of the aspects of the satellite system 100 may be similar to a cable television distribution system, an IPTV (Internet Protocol Television) content distribution system, and/or any other type of content distribution system.

In this example, the satellite system 100 may include a service provider 102, a satellite uplink 104, a plurality of orbiting (e.g., geosynchronous) satellites 106a-c, a satellite dish 108, a PTR (Primary Television Receiver) 110, a plurality of STRs (Secondary Television Receivers) 112a-b, a plurality of televisions 114a-c, and a plurality of computing devices 116a-b. The satellite dish 108 may include or comprise a field-programmable LNB 118. As discussed throughout, the LNB 118 may be programmatically configured or reconfigured as desired so that the LNB 118 may source channels containing programming to at least the PTR 110 according to a particular hardware and/or firmware architecture of the PTR 110. Such an implementation may be beneficial and/or advantageous in many respects. For example, an upgrade of the PTR 110 to a more sophisticated device or platform may not necessarily require that the LNB 118 be replaced. Rather, the personality of the LNB 118 may be modified or changed so that the LNB 118 may source channels containing programming to at least the PTR 110 according to a particular hardware and/or firmware architecture of the PTR 110. Further, it will be appreciated that logistics related to LNB maintenance may be simplified, and the economics related to LNB manufacturing may be vastly improved, when legacy LNBs are phased-out and replaced with the LNB 118, so that for the most part only a particular type of LNB is being used in the field. Still other benefits and/or advantages are possible as well, and an appreciation of such benefits and/or advantages may be understood in light of the present disclosure in its entirety.

The satellite system 100 may also include at least one network 120 that establishes a bi-directional communication path for data transfer between and among each respective element of the satellite system 100 outside of the unidirectional satellite signaling path. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the satellite system 100.

The PTR 110, and the STRs 112a-b, as described throughout may generally be any type of television receiver, television converter, etc., such as a STB (Set-Top-Box) for example. In another example, the PTR 110, and the STRs 112a-b, may exhibit functionality integrated as part of or into a television, a DVR, a computer such as a tablet computing device, or any other computing system or device, as well as variations thereof. Further, the PTR 110 and the network 120, together with the STRs 112a-b and televisions 114a-c, and possibly the computing devices 116a-b, may be incorporated within or form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example satellite system 100 may be configured to communicate in accordance with the MoCA® (Multimedia over Coax Alliance) home entertainment networking standard. Still other embodiments are possible.

In practice, the satellites 106a-c may each be configured to receive uplink signals 122a-b from the satellite uplink 104. In this example, the uplink signals 122a-b may contain one or more transponder streams of particular data or content, such as particular television channel, that is supplied by the service provider 102. For example, each of the respective uplink signals 122a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, and etc.

The satellites 106a-c may further be configured to relay the uplink signals 122a-b to the satellite dish 108 as downlink signals 124a-b. Similar to the uplink signals 122a-b, each of the downlink signals 124a-b may contain one or more transponder streams of particular data or content, such as various encoded and/or at least partially electronically scrambled television channels, on-demand programming, etc., in accordance with an allotted carrier frequency and bandwidth. The downlink signals 124a-b, however, may not necessarily contain the same or similar content as a corresponding one of the uplink signals 122a-b. For example, the uplink signal 122a may include a first transponder stream containing at least a first group or grouping of television channels, and the downlink signal 124a may include a second transponder stream containing at least a second, different group or grouping of television channels. In other examples, the first and second group of television channels may have one or more television channels in common. In sum, there may be varying degrees of correlation between the uplink signals 122a-b and the downlink signals 124a-b, both in terms of content and underlying characteristics.

Continuing with the example implementation-specific scenario, the satellite dish 108 may be provided for use to receive television channels (e.g., on a subscription basis) provided by the service provider 102, satellite uplink 104, and/or satellites 106a-c. For example, the satellite dish 108 may be configured to receive particular transponder streams, or downlink signals 124a-b, from one or more of the satellites 106a-c. Based on the characteristics of the PTR 110 and/or satellite dish 108, however, it may only be possible to capture transponder streams from a limited number of transponders concurrently. For example, a tuner of the PTR 110 may be configured to tune to a single transponder stream from a transponder of a single satellite at a time.

Additionally, the PTR 110, which is communicatively coupled to the satellite dish 108, may subsequently select via tuner, decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented live, or from a recording as previously stored on, by, or at the PTR 110. In this example, the HD channel may be output to the television 114c in accordance with the HDMI/HDCP content protection technologies. Other embodiments are possible.

Further, the PTR 110 may select via tuner, decode, and relay particular transponder streams to one or both of the STRs 112a-b, which may in turn relay particular transponder streams to a corresponding one of the television 114a and the television 114a for display thereon. For example, the satellite dish 108 and the PTR 110 may, respectively, be configured to receive, decode, and relay at least one television channel to the television 114a by way of the STR 112a. Similar to the above-example, the television channel may generally be presented live, or from a recording as previously stored on the PTR 110, and may be output to the television 114a by way of STR 112a in accordance with a particular content protection technology and/or networking standard. Still further, the satellite dish 108 and the PTR 110 may, respectively, be configured to receive, decode, and relay at least one premium television channel to one or both of the computing devices 116a-b. Similar to the above-examples, the television channel may generally be presented live, or from a recording as previously stored on the PTR 110, and may be output to one or both of the computing devices 116a-b in accordance with a particular content protection technology and/or networking standard.

Figure 2:
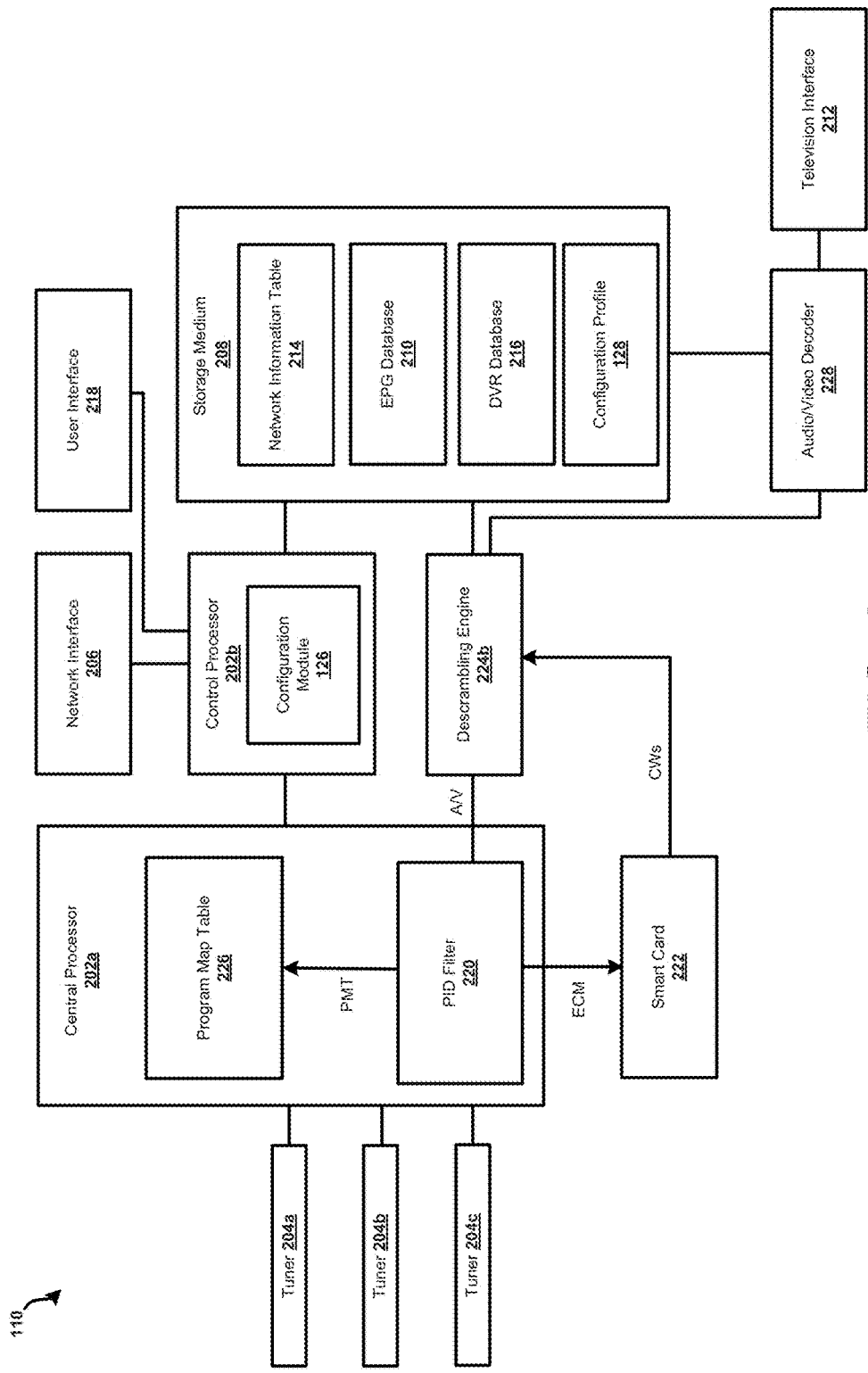
FIG. 2 shows an example block diagram of a television receiver of FIG. 1.

Referring now to FIG. 2, an example block diagram of the PTR 110 of FIG. 1 is shown in accordance with the present disclosure. In some embodiments, at least one of the STRs 112a-b may be configured in a manner similar to that of the PTR 110. In other embodiments, at least one of the STRs 112a-b may be configured to exhibit a reduced functionality as compared to the PTR 110, and may depend at least to a certain degree on the PTR 110 to implement certain features or functionality. In this example, the STRs 112a-b may be referred to as a "thin client."

For brevity, the PTR 110 is depicted in a simplified form, and may generally include more or fewer elements or components as desired in accordance with the present disclosure. For example, the PTR 110 is shown in FIG. 2 to include a configuration module 126 and a configuration profile 128. In general, and as discussed in further detail below, the configuration module 126 may be configured to interact with the configuration profile 128 when the LNB 118 is communicatively coupled (e.g., via wireless and/or hardwire link) to the PTR 110, and provide an indication to the LNB 118 of a particular sourcing scheme, sometimes referred to as a "mode," that the PTR 110 is configured to exhibit. One example sourcing scheme may include or correspond to a "band-translation mode." Another example sourcing scheme may include or correspond to a "channel-stacking mode." Other examples are possible as possible as well. The LNB 118 may then configure or reconfigure itself based on the indication so that the LNB 118 may source channels containing programming to the PTR 110 according to the particular configuration of the PTR 110. As mentioned above, this may represent a paradigm shift in LNB design as typically a specific LNB sourcing scheme is implemented in or as hardware. In contrast, the LNB 118 of the present disclosure is field-programmable and may take on or assume any particular personality so that the LNB 118 may source channels containing programming to any particular receiver according to a receiver-specific configuration.

Additionally, although not explicitly shown in FIG. 2, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Additionally, the PTR 110 may be configured to include any number of other various components or logical modules that are implemented in hardware, software, firmware, or any combination thereof, and such components or logical modules may or may not be implementation-specific.

Referring still to FIG. 2, the PTR 110 in this example includes at least one processor 202, including a central processor 202a and a control processor 202b, a plurality of tuners 204a-c, at least one network interface 206, at least one non-transitory computer-readable storage medium 208, at least one EPG database 210, at least one television interface 212, at least one NIT (Networking Information Table) 214, at least one DVR database 216, at least one user interface 218, at least one PID filter 220, at least one smart card 222, at least one descrambling engine 224, at least one PMT (Program Map Table) 226, and at least one decoder 228. In other embodiments of the PTR 110, fewer or greater numbers of components may be present. Further, functionality of one or more components may be combined; for example, functions of the descrambling engine 224 may be performed by the central processor 202a. Still further, functionality of components may be distributed among additional components, and possibly additional systems, for example, in a cloud-computing type implementation.

The processor 202 may include one or more specialized and/or general-purpose processors configured to perform processes such as tuning to a particular channel, accessing and displaying EPG information from the EPG database 210, and/or receiving and processing input from a user. For example, processor 202 may include one or more processors dedicated to decoding video signals from a particular format, such as MPEG, for output and display on a television and for performing or at least facilitating decryption or descrambling.

The control processor 202b may communicate with the central processor 202a. The control processor 202b may control the recording of television channels based on timers stored in the DVR database 216. The control processor 202b may initiate recording of a television channel by sending a record command along with an indication of the television channel to be recorded to the central processor 202a. The control processor 202b may not send a second record command, when additional recording is to begin at the same time, until an acknowledgement that recording of the first television channel has successfully been received and initiated by the central processor 202a. The control processor 202b may also provide commands to the central processor 202a when recording of a television channel is to cease. In addition to providing commands relating to the recording of television channels, the control processor 202b may provide commands to the central processor 202a that indicate television channels to be output to the decoder 228 for output to a presentation device, such as the television 114c for example.

The control processor 202b may also communicate with the network interface 206 and the user interface 218. The control processor 202b may handle incoming data from the network interface 206 and the user interface 218. Additionally, the control processor 202b may be configured to output data via the network interface 206. Additionally, the control processor 202b may be configured to instantiate and/or implement the configuration module 126 mentioned above. Other embodiments are possible. For example, such functionality may be wholly or at least partially implemented by the central processor 202a.

Figure 3:
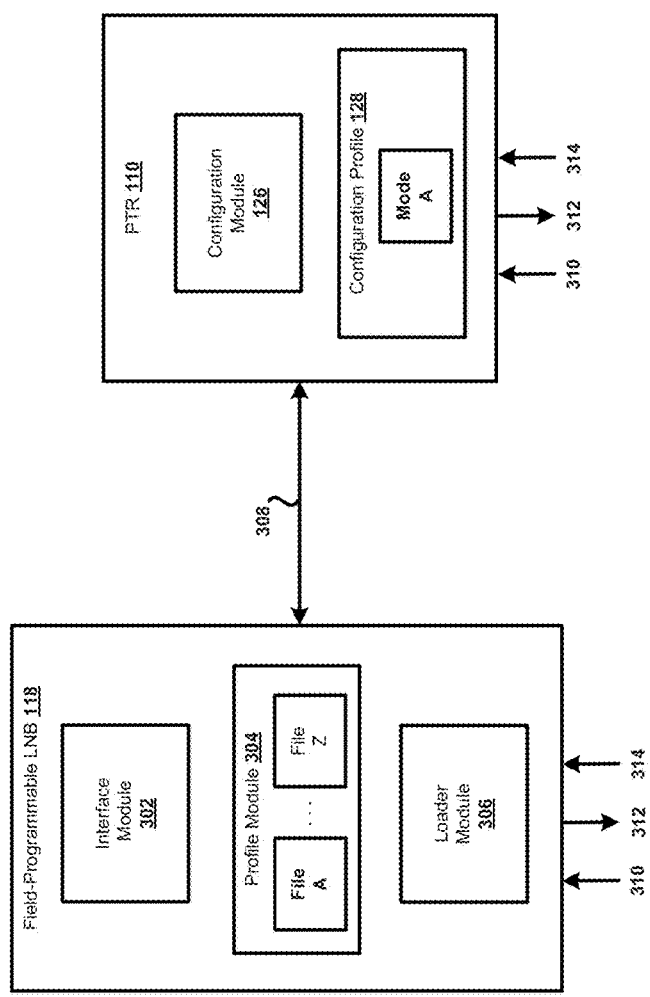
FIG. 3 shows aspects of the example satellite system of FIG. 1 in detail.

The tuners 204a-c may be used to tune to television channels, such as television channels transmitted via satellite or cable, such as satellites 106a-c. Each respective one of the tuner 204a-c may be capable of receiving and processing a single stream of data from a satellite transponder, or a cable channel, at a given time. As such, a single tuner may tune to a single transponder or, for a cable network, a single cable channel. Additionally, one tuner (e.g., tuner 204a) may be used to tune to a television channel on a first transponder stream for display using a television, while another tuner (e.g., tuner 204b) may be used to tune to a television channel on a second transponder for recording and viewing at some other time. Still another tuner (e.g., tuner 204c) may be used to check various television channels to determine if they are available or not. If multiple television channels transmitted on the same transponder stream are desired, a particular tuner (e.g., tuner 204a) may be used to receive the signal containing the multiple television channels for presentation and/or recording. The tuners 204a-c may receive commands from the central processor 202a and/or control processor 202b. Such commands may instruct the tuners 204a-c which frequencies are to be used for tuning. Although three tuners are shown in FIG. 3, the PTR 110 may include more or fewer tuners (e.g., 6 tuner, 8 tuners, 24 tuners, etc.) and the features or aspects of the present disclosure may be implemented similarly, and scale according to number of tuners of the PTR 110.

The network interface 206 may be used to communicate via an alternate communication channel with a television service provider. For example, the primary communication channel between the television service provider and the PTR 110 may be via satellite, which may be unidirectional to the STB, and an another communication channel between the television service provider and the PTR 110, which may be bidirectional, may be via a network, such as the Internet. The PTR 110 may be able to communicate with the service provider 102 of FIG. 1 via network 120. This communication may be bi-directional. For example, data may be transmitted from the PTR 110 to the service provider 102, and from the service provider 102 to the PTR 110. The network interface 206 may be configured to communicate via one or more networks, such as the Internet, to communicate with the service provider 102. Information may be transmitted and/or received via the network interface 206.

The storage medium 208 may represent a non-transitory computer-readable storage medium. The storage medium 208 may include memory and/or a hard drive. The storage medium 208 may be used to store information received from one or more satellites and/or information received via the network interface 206. The storage medium 208 may store information related to the EPG database 210, the NIT 214, and/or the DVR database 216, among other elements or features, such as the configuration profile 128 mentioned above. Recorded television programs may be stored using the storage medium 208. The storage medium 208 may be partitioned or otherwise divided such that predefined amounts of the storage medium 208 are devoted to storage of omnibus channel files and user-selected television programs.

The EPG database 210 may store information related to television channels and the timing of programs appearing on such television channels. The EPG database 210 may be stored using the storage medium 208, which may be a hard drive. Information from the EPG database 210 may be used to inform users of what television channels or programs are popular and/or provide recommendations to the user. Information from the EPG database 210 may provide the user with a visual interface displayed by a television that allows a user to browse and select television channels and/or television programs for viewing and/or recording. Information used to populate the EPG database 210 may be received via the network interface 206 and/or via satellites, such as satellites 106a-c of FIG. 1 via the tuners 204a-c. For instance, updates to the EPG database 210 may be received periodically via satellite. The EPG database 210 may serve as an interface for a user to control DVR functions of the PTR 110, and/or to enable viewing and/or recording of multiple television channels simultaneously.

In addition to being used to provide users with information about scheduled programming, information from the EPG database 210 may be used to determine when television programs begin and end for the purposes of recording. For instance, when a channel-specific file is recorded that contains multiple television channels, the start and end of time of specific television programs within the channel-specific file may be based on the start and end times indicated in the EPG database 210. Other data may be stored within the EPG database 210 that may be useful in managing channel-specific files, such as series identifiers and episode identifiers, which may be used by a television service provider to identify particular television programs.

The decoder 228 may serve to convert encoded video and audio into a format suitable for output to a display device. For instance, the decoder 228 may receive MPEG video and audio from the storage medium 208, or the descrambling engine 224, to be output to a television. MPEG video and audio from the storage medium 208 may have been recorded to the DVR database 216 as part of a previously-recorded television program. The decoder 228 may convert the MPEG video and audio into a format appropriate to be displayed by a television or other form of display device and audio into a format appropriate to be output from speakers, respectively.

The television interface 212 may serve to output a signal to a television, or another form of display device, in a proper format for display of video and playback of audio. As such, the television interface 212 may output one or more television channels, stored television programming from the storage medium 208, such as television programs from the DVR database 216 and/or information from the EPG database 210 for example, to a television for presentation.

The NIT 214 may store information used by the PTR 110 to access various television channels. The NIT 214 may be stored using the storage medium 208. Information used to populate the NIT 214 may be received via satellite, or cable, via the tuners 204a-c and/or may be received via the network interface 206 from a service provider. As such, information present in the NIT 214 may be periodically updated. The NIT 214 may be locally-stored by the PTR 110 using the storage medium 208. Information that may be present in the NIT 214 may include, for example: television channel numbers, a satellite identifier, a frequency identifier, a transponder identifier, an ECM (Entitlement Control Message), a PID (Packet Identifier), one or more audio PIDs, and a video PID. A second audio PID of a channel may correspond to a SAP (Second Audio Program) program, such as in another language. In some embodiments, the NIT 214 may be divided into additional tables. For example, rather than the specific audio PIDs and video PIDs being present in the NIT 214, a channel identifier may be present within NIT 214 which may be used to look up the audio PIDs and video PIDs in another table, such as the PMT 226. For example, the PMT 226 may store information on audio PIDs and video PIDs for television channels that are transmitted on a transponder frequency.

Table 1 below provides a simplified example of the NIT 214 for several television channels. It should be understood that in other embodiments, many more television channels may be represented in the NIT 214. The NIT 214 may be at least periodically updated by a television service provider. As such, television channels may be reassigned to different satellites and/or transponders, and the PTR 110 may be able to handle this reassignment as long as the NIT 214 is updated.

TABLE 1

| Channel | Satellite | Transponder | ECM PID | PMT PID |
|---------|-----------|-------------|---------|---------|
| 4 | 1 | 2 | 27 | 1001 |
| 5 | 2 | 11 | 29 | 802 |
| 7 | 2 | 3 | 31 | 1001 |
| 13 | 2 | 4 | 33 | 804 |

Based on information in the NIT 214, it may be possible to determine the proper satellite and transponder to which to tune for a particular television channel. In some embodiments, the NIT 214 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

The values provided in Table 1 are for example purposes only. Actual values, including how satellites and transponders are identified, may vary. Additional information may also be stored in NIT 214. The same PID may be reused on different transponders.

A DVR may permit a television channel to be recorded for a period of time. DVR functionality of the PTR 110 may be managed by the control processor 202b. The control processor 202b may coordinate the television channel, start time, and stop time of when recording of a television channel is to occur. The DVR database 216 may store information related to the recording of television stations. The DVR database 216 may store timers that are used by the control processor 202b to determine when a television channel should be tuned to and its programs recorded to the DVR database 216. However, other embodiments are possible. For example, in some embodiments, the storage medium 208 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 208 may be devoted to the DVR database 216. Timers may be set by a service provider and/or one or more users of the PTR 110.

DVR functionality of the control processor 202b may have multiple modes. For example, DVR functionality of the control processor 202b may be configured to record individual television programs selected by a user to the DVR database 216. Using the EPG database 210, a user may select a particular television program. Based on the date, time period, and television channel indicated by the EPG database 210, the control processor 202b may record the associated television program to the DVR database 216. In another example, the DVR database 216 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by a television service provider (e.g., service provider 102).

The user interface 218 may include a remote control, physically separate from PTR 110, and/or one or more buttons on the PTR 110 that allows a user to interact with the PTR 110. The user interface 218 may be used to select a television channel for viewing, view information from the EPG database 210, and/or program a timer stored to the DVR database 216 wherein the timer may be used to control the DVR functionality of the control processor 202b.

Referring back to tuners 204a-c, television channels received via satellite, or cable, may contain at least some scrambled data. Packets of audio and video may be scrambled to prevent unauthorized users, such as nonsubscribers, from receiving television programming without paying the television service provider. When one of the tuners 204a-c is receiving data from a particular transponder of a satellite, the transponder stream may be a series of data packets corresponding to multiple television channels. Each data packet may contain a PID, which, in combination with the NIT 214 and/or the PMT 226, can be determined to be associated with particular television channel. Particular data packets, referred to as ECMs may be periodically transmitted. ECMs may be associated with another PID and may be encrypted; the PTR 110 may use the smart card 222 to decrypt ECMs. Decryption of an ECM may only be possible when the user (e.g., PTR 110) has authorization to access the particular television channel associated with the ECM. When an ECM is determined to correspond to a television channel being stored and/or displayed, the ECM may be provided to the smart card 222 for decryption.

When the smart card 222 receives an encrypted ECM, the smart card 222 may decrypt the ECM to obtain some number of control words. In some embodiments, from each ECM received by the smart card 222, two control words are obtained. In some embodiments, when the smart card 222 receives an ECM, it compares the ECM to the previously received ECM. When the two ECMs match, the second ECM is not decrypted because the same control words would be obtained. In other embodiments, each ECM received by the smart card 222 is decrypted; however, when a second ECM matches a first ECM, the outputted control words will match; thus, effectively, the second ECM does not affect the control words output by the smart card 222. The smart card 222 may be permanently part of the PTR 110 or may be configured to be inserted and removed from PTR 110.

The central processor 202a may be in communication with the tuners 204a-c and the control processor 202b. The central processor 202a may be configured to receive commands from the control processor 202b. Such commands may indicate when to start/stop recording a television channel and/or when to start/stop causing a television channel to be output to a television. The central processor 202a may control the tuners 204a-c. The central processor 202a may provide commands to the tuners 204a-c that instruct the tuners which satellite, transponder, and/or frequency to tune to. From the tuners 204a-c, the central processor 202a may receive transponder streams of packetized data. As previously detailed, some or all of these packets may include a PID that identifies the content of the packet.

The central processor 202a may be configured to create at least one PID filter 220 that sorts packets received from the tuners 204a-c based on the PIDs. When a tuner is initially tuned to a particular frequency, such as a particular transponder of a satellite, a PID filter may be created based on a PID of PMT data. The PID of PMT data packets may be known because it is stored as part of the NIT 214. From the PMT data packets, the PMT 226 may be constructed by central processor 202a.

Table 2 below provides an example extract of a PMT. The PMT 226 may be specific to a particular transponder. As such, when tuning to a different transponder occurs, a new PMT may be created for the different transponder. Accordingly, based on the information present in the PMT 226, the audio and video PIDs for specific television channels may be identified. A television channel may have multiple audio PIDs due to a second audio program, which may be in a different language.

TABLE 2

| Channel | Video PID | 1$^{st}$ Audio PID | 2$^{nd}$ Audio PID |
|---------|-----------|--------------------|--------------------|
| 4       | 1003      | 2383               | 2119               |
| 5       | 2993      | 2727               | 2728               |
| 7       | 9238      | 1233               | 0129               |
| 13      | 0012      | 9348               | —                  |

The values provided in Table 2 are for example purposes only. Actual values may vary. Additional information or less information may also be stored in the PMT 226.

The PID filter 220 may be configured to filter data packets based on PIDs. In some embodiments, the PID filter 220 is created and executed by central processor 202a. In other embodiments, separate hardware may be used to create and execute multiple PID filters. Depending on a television channel selected for recording/viewing, a PID filter may be created to filter the video and audio packets associated with the television channel, based on the PID assignments present in the PMT 226. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 224 or the smart card 222; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 214, may be appropriately routed by the PID filter 220. At a given time, one or multiple PID filters may be executed by the central processor 202a.

The descrambling engine 224 may use the control words output by the smart card 222 in order to descramble video and/or audio corresponding to television channels for storage and/or presentation. Video and/or audio data contained in the transponder data stream received by the tuners 204a-c may be scrambled. Video and/or audio data may be descrambled by descrambling engine 224 using a particular control word. Which control word output by the smart card 222 to be used for successful descrambling may be indicated by a scramble control identifier present within the data packet containing the scrambled video or audio. Descrambled video and/or audio may be output by the descrambling engine 224 to the storage medium 208 for storage in the DVR database 216 and/or to the decoder 228 for output to a television or other presentation equipment via the television interface 212.

For simplicity, the PTR 110 of FIG. 2 has been reduced to a block diagram; commonly known parts, such as a power supply, have been omitted. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules. Further, the components of the PTR 110 may be part of another device, such as built into a television. Also, while the PTR 110 may be used to receive, store, and present television channels received via a satellite, it should be understood that similar components may be used to receive, store, and present television channels via a cable network.

Referring now to FIG. 3, aspects of the example satellite system 100 of FIG. 1 are shown in detail. In particular, the PTR 110 is shown to include the configuration module 126 and the configuration profile 128, and the LNB 118 is shown to include an interface module 302, a profile module 304, and a loader module 306. In this example, a coaxial cable 308 may couple the LNB 118 to the PTR 110. Other embodiments are possible.

In general, and as mentioned above, the configuration module 126 may be configured to interact with the configuration profile 128 when the LNB 118 is communicatively coupled (e.g., via wireless and/or hardwire link) to the PTR 110, and provide an indication to the LNB 118 of a particular sourcing scheme, sometimes referred to as a "mode," that the PTR 110 is configured to exhibit. For example, in one embodiment, one or both of the LNB 118 and the PTR 110 may detect initial coupling of the LNB 118 to the PTR 110, either through the coaxial cable 308 or by some other mechanism. In response to the detection, similar to a "plug-and-play" scenario for example, the configuration module 126 may access the configuration profile 128 and determine or identify a particular sourcing scheme of the PTR 110. For example, as shown in the configuration profile 128 in FIG. 3, the particular sourcing scheme of the PTR 110 may correspond to a "Mode A."

This information may be passed from the configuration module 126 of the PTR 110 to the interface module 302 of the LNB 118. In response, the interface module 302 may activate the loader module 306 to access a particular file, from among any number of other files, from the profile module 304 that is known to be associated with the particular sourcing scheme of the PTR 110. For example, as shown in FIG. 3, the loader module 306 may access a particular file "File A" from the profile module 304, where File A is known to associated with the particular sourcing scheme of the PTR 110 identified as the Mode A within the configuration profile 128. Here, it is contemplated that loader module 306 may then execute or run File A to program or reprogram the LNB 118 so that the LNB 118 may source channels containing programming to the PTR 110 according to the particular configuration or mode of the PTR 110. For example, when the PTR 110 is band-translation-enabled, the LNB 118 may program itself so as to be band-translation-enabled.

The above-example may correspond to an automated LNB programming implementation. Other embodiments are however possible. For example, in one embodiment, either one of the LNB 118 and the PTR 110 may detect or otherwise receive a first signal 310. The first signal 310 may originate from, for example, the computing device 116a as shown in FIG. 1. The first signal 310 may instantiate a communication sequence between the configuration module 126 of the PTR 110 and the interface module 302 of the LNB 118. As part of the communication sequence, the configuration module 126 may access the configuration profile 128 and determine or identify a particular sourcing scheme of the PTR 110. For example, as shown in the configuration profile 128 in FIG. 3, the particular sourcing scheme of the PTR 110 may correspond to the Mode A.

Further, as part of the communication sequence, this information (i.e., "Mode A") may be passed from the configuration module 126 of the PTR 110 to the interface module 302 of the LNB 118. Subsequently, such as in confirmation of the information being passed from the configuration module 126 to the interface module 302, either one of the LNB 118 and the PTR 110 may send a second signal 312 to the computing device 116a for example. The second signal 312 may provide an indication that the LNB 118 is ready to program itself so that the LNB 118 may source channels containing programming to the PTR 110 according to the particular configuration or mode of the PTR 110.

Subsequently, either one of the LNB 118 and the PTR 110 may detect or otherwise receive a third signal 314 from the computing device 116a for example. Continuing with the present example, the third signal 314 may instantiate the loader module 306 to access a particular file, from among any number of other files, from the profile module 304 that is known to be associated with the particular sourcing scheme of the PTR 110. For example, as shown in FIG. 3, the loader module 306 may access the particular file File A from the profile module 304, where File A is known to be associated with the particular sourcing scheme of the PTR 110 identified as the Mode A within the configuration profile 128. The loader module 306 may then execute or run File A to program or reprogram the LNB 118 so that the LNB 118 may source channels containing programming to the PTR 110 according to the particular configuration or mode of the PTR 110. For example, when the PTR 110 is band-translation-enabled, the LNB 118 may program itself so as to be channel-stacking-enabled.

Still other embodiments are possible. For example, it is contemplated that only the first signal 310 might be required to instantiate a process so that LNB 118 may program or reprogram itself so that the LNB 118 may source channels containing programming to the PTR 110 according to the particular configuration or mode of the PTR 110. In either case, that is, if only a single signal or more extensive signaling is implemented, it is contemplated that this may for example be performed by a technician as part of a system upgrade, where the PTR 110 may replace another receiver. For example, the PTR 110 may include, among other things, a greater number of tuners (e.g., 8 tuners) than a number of tuners (e.g., 3 tuners) of a legacy receiver being replaced by the PTR 110. The initial example in contrast, where LNB programming or reprogramming is primarily an automated process, might lend itself well to an initial installation of the PTR 110, whereby a consumer might perfect the connection between the LNB 118 and the PTR 110 by plugging in the coaxial cable 308 to an appropriate port of the PTR 110. Still other embodiments are possible as well.

Figure 4:
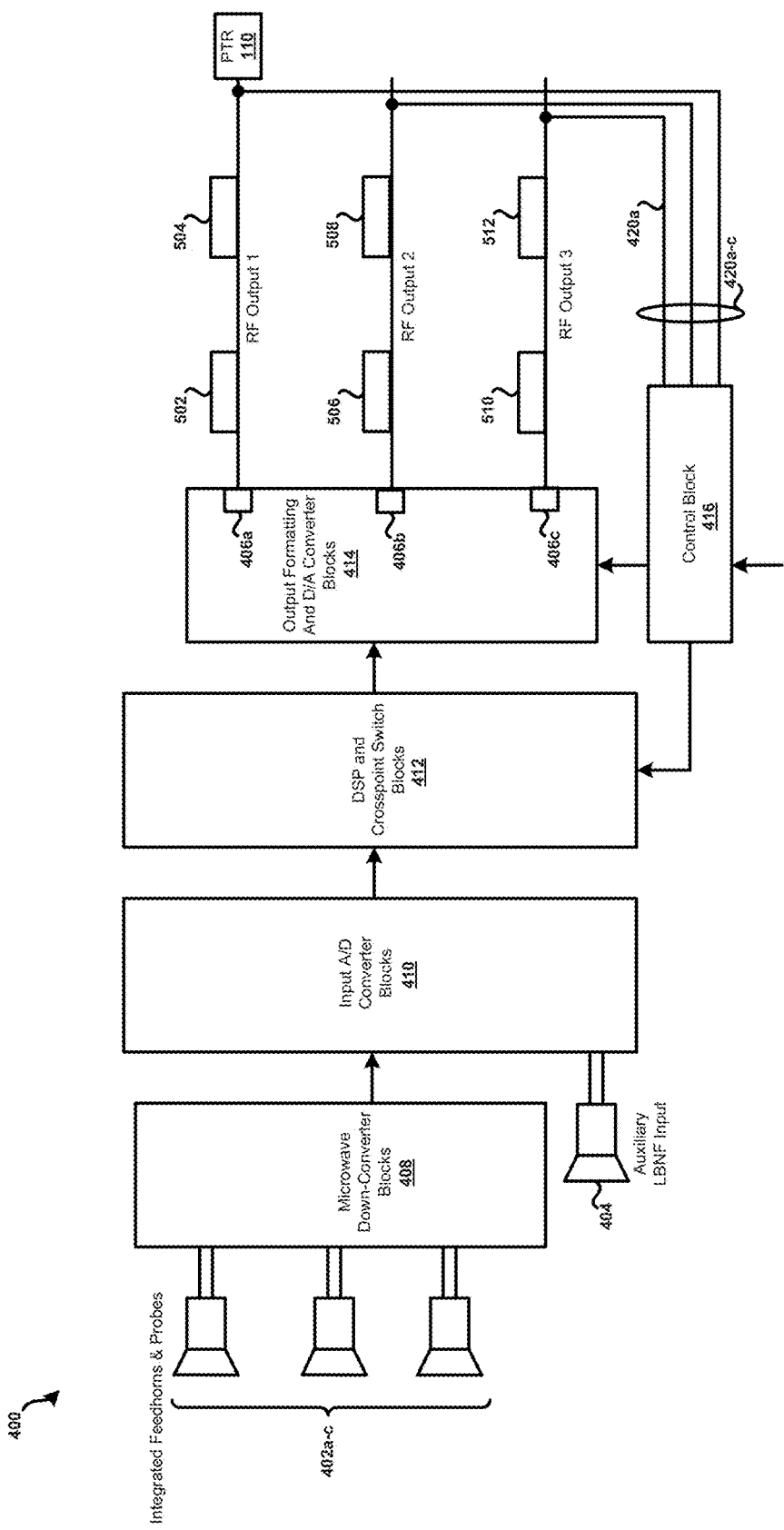
FIG. 4 shows an example low-noise block downconverter architecture in a first mode.
Figure 5:
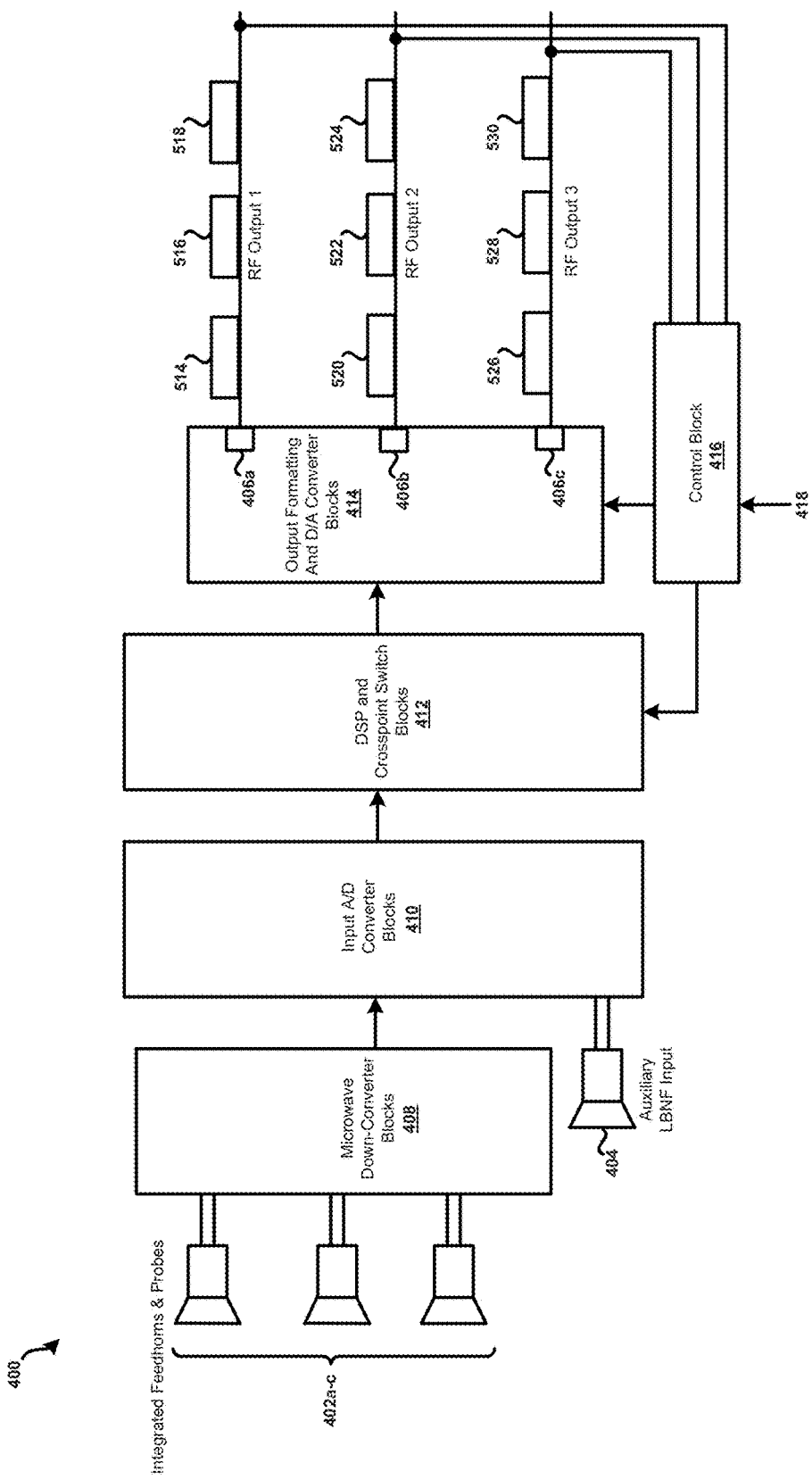
FIG. 5 shows the example architecture of FIG. 4 in a second mode.
Figure 6:
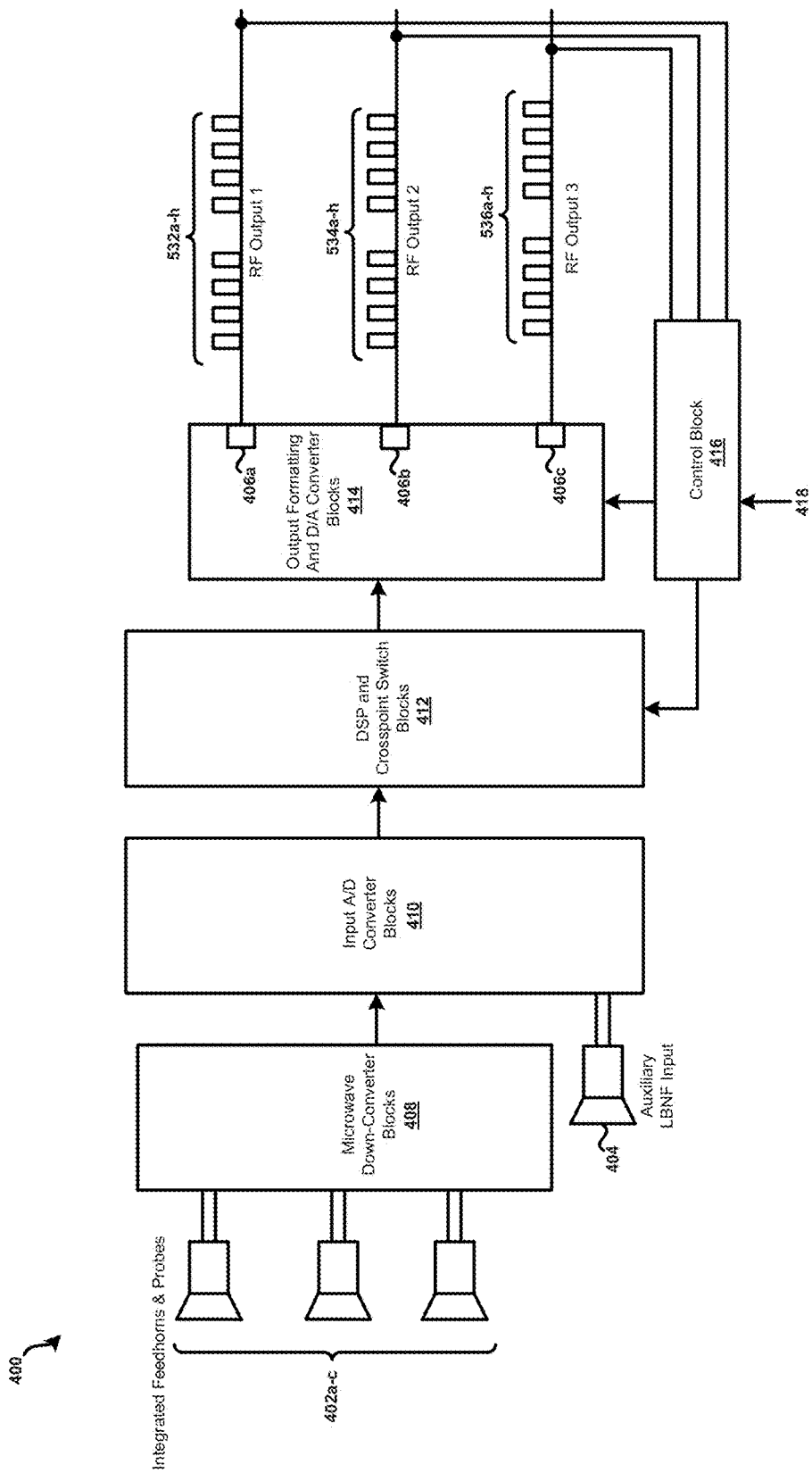
FIG. 6 shows the example architecture of FIG. 5 in a third mode.

Referring now to FIGS. 4-6, a simplified example architecture 400 of the LNB 118 is shown in accordance with the present disclosure. In general, one or more modules or components of the LNB 118 may be realized in or as, or incorporated within or on, for example, an ASIC (Application Specific Integrated Circuit), SoC (System on Chip), and/or other type of integrated circuit implementation. In FIG. 4, the LNB 118 is configured as a dual-band translation LNB. In FIG. 5, the LNB 118 is configured as a triple-band translation LNB. In FIG. 6, the LNB 118 is configured as a channel-stacking LNB. In these examples, it is contemplated that the LNB 118 may be programmed or reprogrammed in the field to exhibit any one of a dual-band band translation mode, a triple-band band translation mode, and a channel-stacking mode, to source channels containing programming to the PTR 110, for example, based on the particular configuration or mode of the PTR 110. Other modes are possible as well, and the example architecture 400 may include other components to mediate and or process signals.

The LNB 118 may be mounted to or integrated with a feedhorn that is coupled to the satellite dish 108 of FIG. 1, but may include RF probes 402*a-c*, along with an auxiliary RF probe 404, and RF output ports 406*a-c*. In this example, the probes 402*a-c* may operate independently from each other, and the LNB 118 may detect or receive incoming signals broadcast from each of the satellites 106*a-c* via the probes 402*a-c*, assuming that the satellite dish 108 is properly orientated towards the sky. The ports 406*a-c* too may be independent from each other, and each of the respective ports 406*a-c* may be coupled to a particular distinct receiver via coaxial cable, for example, to source channels containing programming as requested by each respective receiver. In operation, a first stage 408 in the signal path may at least amplify and mix down incoming satellite signals to an intermediate frequency band, such as L-Band or S-Band for example. It is contemplated that the first stage 408 may be implementation-specific, and may evolve as technology evolves. In one embodiment, the first stage 408 may be realized as or include a heterodyne along with additionally components to mix down an input signal down to an IF frequency. Other embodiments are however possible. For example, the first stage 408 may be implemented as a direct conversion block, where an input signal is mixed down to baseband. Still other embodiments are possible.

A second stage 410 in the signal path may sample incoming satellite signals according to the Nyquist Theorem so that the signals may be further processed in the digital domain following the second stage 410. A third stage 412 and a fourth stage 414 in the signal path may operate on or further process the digitized signals so that the LNB 118 may source channels containing programming to a particular receiver coupled to a particular one of the ports 406*a-c*. For example, when a particular receiver coupled to the port 406*a* is configured as a triple-band band translation device, the third stage 412 and the fourth stage 414 may together serve to format the output of the second stage 410 so that data output on port 406*a* is formatted according to a triple-band band translation mode. In another example, when a particular receiver coupled to the port 406*b* is configured as a channel-stacking device, the third stage 412 and the fourth stage 414 may together serve to format the output of the second stage 410 so that data output on port 406*b* is formatted according to a channel-stacking mode. In still another example, when a particular receiver coupled to the port 406*c* is configured as a dual-band band translation device, the third stage 412 and the fourth stage 414 may together serve to format the output of the second stage 410 so that data output on port 406*c* is formatted according to a dual-band band translation mode. Still many other configurations are possible.

For example, as shown in FIG. 4, and mentioned above, the LNB 118 is configured as a dual-band translation LNB. Accordingly, a first band 502 with a width of about 500 MHz and a second band 504 with a width of about 500 MHz are shown as being created and output by the LNB 118 on port 406*a*. Further, a third band 506 with a width of about 500 MHz and a fourth band 508 with a width of about 500 MHz are shown as being created and output by the LNB 118 on port 406*b*. Still further, a fifth band 510 with a width of about 500 MHz and a sixth band 512 with a width of about 500 MHz are shown as being created and output by the LNB 118 on port 406*c*. In general, FIG. 4 is intended to represent or indicate that each tuner of a particular two tuner receiver coupled to the port 406*a* via coaxial cable may request any frequency band from any one of the satellites 106*a-c*, and yet receive the frequency band in the frequency range for which a corresponding tuner has already been programmed. For example, a particular tuner of the PTR 110 may be programmed to receive the band 950-1450 MHz (i.e., within L-band), while another particular tuner of the PTR 110 may be programmed to receive the band 1650-2150 MHz (i.e., within S-band). However, more than one tuner of the PTR 110 may be may be programmed to receive the same or similar band, such as the band 950-1450 MHz. Additionally, each tuner of a particular two tuner receiver coupled to the port 406*b* via coaxial cable may request any frequency band from one of the satellites 106*a-c*, and yet receive the frequency band in the frequency range for which a corresponding tuner has already been programmed. Still further, each tuner of a particular two tuner receiver coupled to the port 406*c* via coaxial cable may request any frequency band from one of the satellites 106*a-c*, and yet receive the frequency band in the frequency range for which a corresponding tuner has already been programmed.

Here, it is noted that a particular polarity band (e.g., right hand circular polarized, left hand circular polarized, etc.) broadcast by a particular satellite is about 500 MHz wide, and thus each of the respective bands 502-512 may be distinct and correspond to a particular polarity band broadcast by a particular satellite. In this manner, the LNB 118 configured as a dual-band translation LNB as described in connection with FIG. 4 may be analogous to a polarity band selection or filter that selects between a right hand circular polarized beam and left hand circular polarized beam depending on implementation. Each polarity band passed to a particular receiver may be processed by the receiver so that a particular requested service (e.g., HBO®, CNN®, etc.) may be output by the receiver for presentation by a display device, such as the television 114*c* of FIG. 1 for example. In the example of FIG. 4, the intermediate frequency band used to transfer the respective bands 502-512 to a particular receiver may have a width of about 1 GHz. Other embodiments are possible.

For example, as shown in FIG. 5, and mentioned above, the LNB 118 is configured as a triple-band translation LNB. Accordingly, a first band 514 with a width of about 500 MHz, a second band 516 with a width of about 500 MHz, and a third band 518 with a width of about 500 MHz are shown as being created and output by the LNB 118 on the port 406*a*. Further, a fourth band 520 with a width of about 500 MHz, a fifth band 522 with a width of about 500 MHz, and a sixth band 524 with a width of about 500 MHz are shown as being created and output by the LNB 118 on the port 406*b*. Still further, a seventh band 526 with a width of about 500 MHz, an eighth band 528 with a width of about 500 MHz, and a ninth band 530 with a width of about 500 MHz are shown as being created and output by the LNB 118 on the port 406*c*. In general, FIG. 5 is intended to represent or indicate that each tuner of a particular three tuner receiver coupled to the port 406*a* via coaxial cable may request any frequency band from any one of the satellites 106*a-c*, and yet receive the frequency band in the frequency range for which a corresponding tuner has already been programmed. Further, each tuner of a particular three tuner receiver coupled to the port 406*b* via coaxial cable may request any frequency band from one of the satellites 106*a-c*, and yet receive the frequency band in the frequency range for which a corresponding tuner has already been programmed. Still further, each tuner of a particular three tuner receiver coupled to port 406c via coaxial cable may request any frequency band from one of the satellites 106a-c, and yet receive the frequency band in the frequency range for which a corresponding tuner has already been programmed.

As mentioned above, a particular polarity band broadcast by a particular satellite is about 500 MHz wide, and thus each of the respective bands 514-530 may be distinct and correspond to a particular polarity band broadcast by a particular satellite. In this manner, the LNB 118 configured as a triple-band translation LNB as described in connection with FIG. 5 may be analogous to a polarity band filter. Each polarity band passed to a particular receiver may be processed by the receiver so that a particular requested service (e.g., HBO®, CNN®, etc.) may be output by the receiver for presentation by a display device, such as the television 114c of FIG. 1 for example. In the example of FIG. 5, the intermediate frequency band used to transfer the respective bands 514-530 to a particular receiver may have a width of about 1.5 GHz. Other embodiments are possible.

For example, as shown in FIG. 6, and mentioned above, the LNB 118 is configured as a channel-stacking LNB. Accordingly, a first plurality of bands 532a-h each with a width of about 30 MHz are shown as being created and output by the LNB 118 on the port 406a. Further, a second plurality of bands 534a-h each with a width of about 30 MHz are shown as being created and output by the LNB 118 on the port 406b. Still further, a third plurality of bands 536a-h each with a width of about 30 MHz are shown as being created and output by the LNB 118 on the port 406c. In general, FIG. 6 is intended to represent that each tuner of a particular eight tuner receiver coupled to the port 406a via coaxial cable may request any frequency band from one of the satellites 106a-c, and yet receive the frequency band in the frequency range for which a corresponding tuner has already been programmed. Further, each tuner of a particular eight-tuner receiver coupled to the port 406b via coaxial cable may request any frequency band from one of satellite 106a-c and yet receive it in the frequency range for which a respective tuner has already been programmed. Still further, each tuner of a particular eight tuner receiver coupled to the port 406c via coaxial cable may request any frequency band from one of satellite 106a-c, and yet receive the frequency band in the frequency range for which a corresponding tuner has already been programmed.

Here, it is noted that a particular transponder band within a particular polarity band broadcast by a particular satellite is about 30 MHz, and thus each of the respective bands 532a-h, 534a-h, and 536a-h may be distinct and correspond to a particular transponder band within a particular polarity band broadcast by a particular satellite. In this manner, the LNB 118 configured as a channel-stacking LNB as described in connection with FIG. 6 may be considered analogous to a transponder band filter. Each transponder band passed to a particular receiver may be processed by the receiver so that a particular requested service (e.g., HBO®, CNN®, etc.) may be output by the receiver for presentation by a display device, such as the television 114c for example. In the example of FIG. 6, the intermediate frequency band used to transfer the respective bands 532a-h, 534a-h, and 536a-h to a particular receiver may have a width of about 1 GHz. Other embodiments are possible.

For example, it is contemplated that additional and/or variations on the example implementations discussed in connection with FIG. 4-6 are within the scope of the present disclosure. For example, and referring to FIG. 6, when the LNB 118 is configured such that only the port 406a is active or activated, it is contemplated that a total of twenty-four distinct frequency bands each with a width of about 30 MHz may be created and output by the LNB 118 on the port 406a. Accordingly, each tuner of a particular twenty-four tuner receiver that is coupled to the port 406b via coaxial cable may request any frequency band from any one of the satellite 106a-c, and yet receive the frequency band in the frequency range for which a corresponding tuner has already been programmed. Still other embodiments are possible as well.

For example, it is contemplated that the LNB 118 may be configured so that it may function as a dual-band translation LNB with respect to sourcing channels containing programming on the port 406a, as a triple-band translation LNB with respect to sourcing channels containing programming on the port 406b, and as a channel-stacking LNB with respect to sourcing channels containing programming on the port 406c. In this manner, the LNB 118 may at least be configured to simultaneously source channels containing programming to three differently configured receivers according to a particular configuration of each respective receiver. Further, it will be appreciated that, in consideration of the example implementation or architecture of FIGS. 4-6, nine distinct sourcing configurations may exist, and that aspects of the present disclosure may be extended to a particular field-programmable LNB having N output ports, where N is an arbitrary integer value.

TABLE 3

| RF Output Port | Output Format | Output Format | Output Format |
|---|---|---|---|
| Port 406a | Dual-band translation | Triple-band translation | Channel-stacking |
| Port 406b | Dual-band translation | Triple-band translation | Channel-stacking |
| Port 406c | Dual-band translation | Triple-band translation | Channel-stacking |

Table 3 above summarizes nine distinct sourcing configurations from the perspective of the ports 406a-c of the example architecture 400 of the LNB 118 shown in FIGS. 4-6. For example, in one configuration or arrangement the LNB 118 may be configured so that it may function as a triple-band translation LNB with respect to sourcing channels containing programming on the port 406a (indicated by underlining in Table 3), as a channel-stacking translation LNB with respect to sourcing channels containing programming on the port 406b, and as a triple-band translation LNB with respect to sourcing channels containing programming on the port 406c. Other embodiments are possible. Further, with reference to Table 3, other distinct configurations in terms of content sourced on a particular one of ports 406a-c may exist when taken into account that one or more of the ports 406a-c may be deactivated or disabled so as to not exhibit any particular type of sourcing scheme.

As discussed throughout, the LNB 118 may be programmatically configured or reconfigured as desired so that the LNB 118 may source channels containing programming to any particular receiver according to a receive-specific hardware and/or firmware. Extending this to example of FIGS. 4-6, it is contemplated that a controller module 416 of the LNB 118 may access and run a particular file, such as File A as discussed above in connection with FIG. 3 for example, in response to a command signal 418 to program, reprogram, configure, reconfigure, etc., logic within at least the third stage 412 and the fourth stage 414 of the LNB 118 to modify or change the personality and/or functionality of the LNB 118 so that the LNB 118 may source channels containing programming to any particular receiver according to a receive-specific hardware and/or firmware.

While in FIGS. 4-6 the command signal 418 signal is shown as being put to a bottom portion of the controller module 416, it is contemplated that the command signal 418 may be supplied to the LNB 118 over a physical or wireless connection, represented by connections 420a-c, where connection 420a may represent a communication connection between the controller module 416 of the LNB 118 and the PTR 110, for example as shown in FIG. 4. Other embodiments are possible. Further, other embodiments are possible where other stages or components of the LNB 118 may additionally or alternately be programmed in the response to the command signal 418, and further such programming may be based upon implementation-specific details. An example process or method associated with programming or configuring logic within at least the third stage 412 and the fourth stage 414 of the LNB 118 is discussed in further detail below in connection with FIG. 7.

Figure 7:
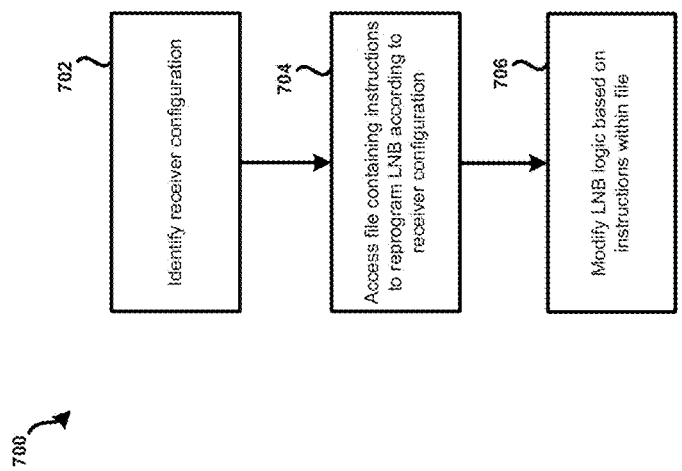
FIG. 7 shows an example method in accordance with the present disclosure.

Referring now to FIG. 7, an example method 700 is shown in accordance with the present disclosure. In general, steps, operations, or modules of the method 700 as described may ultimately be implemented by at least one of the LNB 118 and the PTR 110 of FIG. 1. Other embodiments are however possible. For example, one or more steps or modules of the method 700 may be implemented wholly or at least partially by or on one or more of the other respective devices or components of the satellite system 100 as described above in connection with FIG. 1.

The example method 700 may include or comprise identifying (step 702), by the LNB 118, a particular configuration of at least one receiver that is coupled to the LNB 118. For example, a particular configuration of the PTR 110 may be identified or determined by the LNB 118 in response to detection of connection of the LNB 118 to the PTR 110. For example, in a "plug-and-play" type scenario, the LNB 118 and/or PTR 110 may detect a connection being established between the LNB 118 and PTR 110 when a first end of the coaxial cable 308 is initially coupled to the PTR 110, a second end of the coaxial cable 308 being already connected to the LNB 118. Other embodiments are possible. For example, a particular configuration of the PTR 110 may be identified or determined by the LNB 118 in response to detection of an instruction received by one of the PTR 110 and LNB 118 based on user-input to identify the particular configuration. For example, an individual using the computing device 116a of FIG. 1 for example may establish a communication link between the computing device 116a and one of the PTR 110 and LNB 118, and initiate a command (e.g., hitting "enter") to instantiate a communication sequence between the PTR 110 and LNB 118 so that the LNB 118 may determine or identify a particular configuration of the PTR 110. Other embodiments are possible.

The example method 700 may include or comprise accessing (step 704), by the LNB 118, a particular file containing instructions to configure the LNB 118 so that output signals provided by the LNB 118 to the at least one receiver are formatted according to the particular configuration of the at least one receiver. For example, assuming that the LNB 118 determines or identifies (at step 702) that a particular sourcing scheme of the PTR 110 corresponds to a "Mode A," the LNB 118 may access a particular file File A, where File A is known to associated with the particular sourcing scheme of the PTR 110 identified as the Mode A. In this example, the File A may include or correspond to some type of programming package that includes logic configuration information, loading information, validation information, and etc., so that the LNB 118 may access the File A and configure or reconfigure itself so that the LNB 118 may source channels containing programming to the PTR 110 according to the particular configuration or mode of the PTR 110. Other embodiments are possible.

The example method 700 may include or comprise modifying (step 706), by the LNB 118, logic of the LNB 118 based on the instructions so that output signals provided by the LNB 118 to the at least one receiver are formatted according to the particular configuration of the at least one receiver. Continuing with the example scenario, the LNB 118 may instantiate, execute, load for execution, etc., File A which includes logic configuration information, loading information, validation information, and etc., so that the LNB 118 may configure or reconfigure itself so that the LNB 118 may source channels containing programming to the PTR 110 according to the particular configuration or mode of the PTR 110. For example, the LNB 118 may program or reprogram itself so that output signals provided by the LNB 118 to the PTR 118 over the coaxial cable 308 are formatted according to a band-stacking mode or a channel-stacking mode.

In a similar implementation, the LNB 118 may program or reprogram itself so that output signals provided by the LNB 118 to the PTR 118 over the coaxial cable 308 are formatted according to a polarity band granularity filtering mode or a transponder band granularity filtering mode. In this example, the polarity band granularity filtering mode may corresponding to filtering incoming signals from the satellites 106a-c at the polarity band level, where in one example embodiment a polarity band is about 500 MHz in band width. Other embodiments are possible. The transponder band granularity filtering mode may corresponding to filtering incoming signals from the satellites 106a-c at the transponder band level, where in one example embodiment a transponder band is about 30 MHz in band width. Other embodiments are possible.

The LNB 118 of the present disclosure may represent a paradigm shift with respect to LNB design as typically a specific LNB sourcing scheme is implemented in or as hardware. In contrast, the LNB 118 of the present disclosure is field-programmable and may take on or assume any particular personality so that the LNB 118 may source channels containing programming to any particular receiver according to the receiver-specific configuration. It is contemplated that there are a number of benefits and/or advantages associated with such an implementation in addition to those mentioned above.

For example, it is contemplated that the number "truck rolls" per arbitrary unit of time may be significantly reduced, or the need to have a service vehicle and technician be deployed to a particular customer location. For example, once a particular LNB configured in a manner consistent with the LNB 118 is installed, a television receiver or set-top-box, possibly as an upgrade, may be shipped to a customer or customer location, and then the customer may visit certain instructions to hook-up the television receiver. As part of a discovery process, the LNB may determine type, model, etc., of the television receiver and then reconfigure itself so as to be compatible with the television receiver. It will be appreciated that in such an implementation a significant savings may be realized in terms of financial considerations, also while allowing for certain resources (equipment, human, etc.) to be allocated or reallocated to other functions. Also, inventory and supply chain management may be simplified as older LNBs are phased-out and replaced with an LNB configured in a manner consistent with the LNB 118. This is because it may only be needed to stock one type of LNB as opposed to multiple types of application-specific LNBs. Also, economies of scale in manufacturing may be realized when only a single type of LNB is produced.

Figure 8:
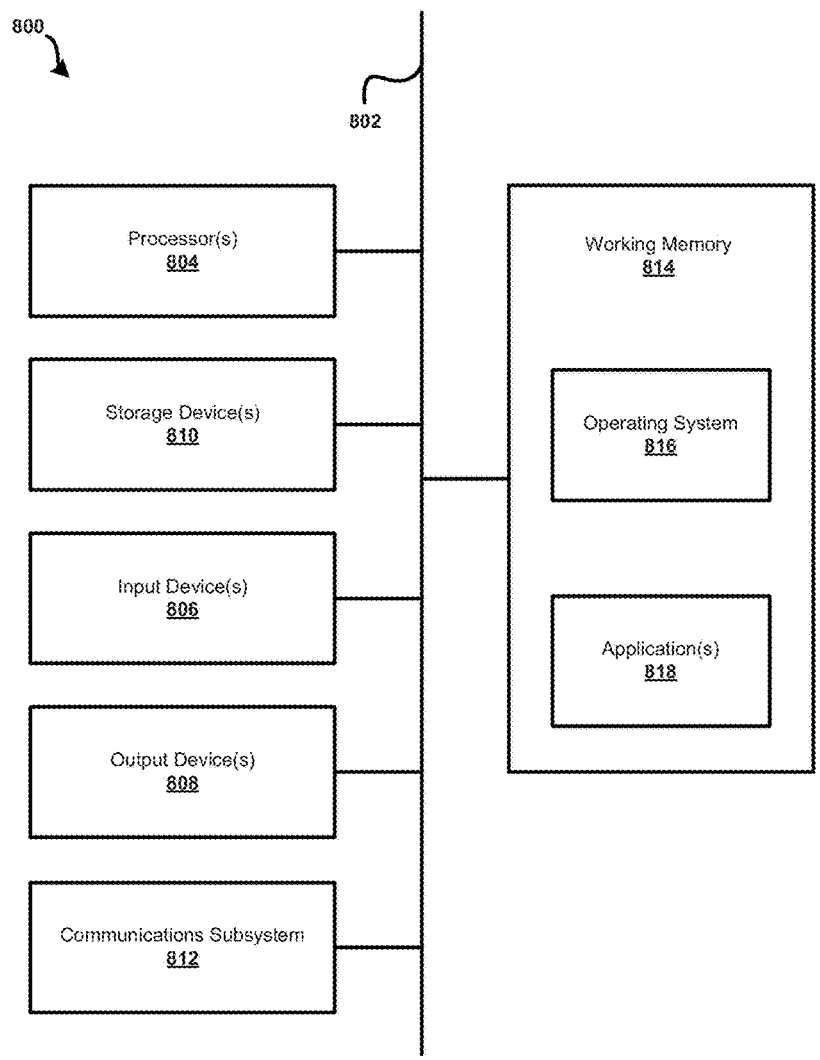
FIG. 8 shows an example computing system or device.

FIG. 8 shows an example computer system or device 800 in accordance with the present disclosure. An example of a computer system or device includes an enterprise server, blade server, desktop computer, laptop computer, tablet computer, personal data assistant, smartphone, gaming console, STB, television receiver, and/or any other type of machine configured for performing calculations. The computer system 800 may be wholly or at least partially incorporated as part of previously-described computing devices, such as any of the respective elements of at least FIG. 1. Further, the computer device 800 may be configured to perform and/or include instructions that, when executed, cause the computer system 800 to perform the method of FIG. 7. Still further, the computer device 800 may be configured to perform and/or include instructions that, when executed, cause the computer system 800 to instantiate and implement functionality of the PTR 110 and/or LNB 118 of at least FIG. 1.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., television), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 812 may permit data to be exchanged with a network (such as the network described below, to name one example), other computer systems, and/or any other devices described herein. In many embodiments, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 800) to perform methods in accordance with various embodiments of the disclosure. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for programmatically configuring a low-noise block downconverter (LNB), comprising:
   receiving, at the LNB from at least one television receiver, an indication of a sourcing scheme or mode that the at least one television receiver is configured to exhibit;
   accessing, by the LNB, a particular file stored locally on the LNB and containing instructions to configure the LNB so that output signals provided by the LNB to the at least one television receiver are formatted according to the sourcing scheme or mode indicated by the at least one television receiver; and
   modifying logic of the LNB based on the instructions so that output signals provided by the LNB to the at least one television receiver are formatted according to the sourcing scheme or mode of the at least one television receiver.

2. The method of claim 1, further comprising modifying logic of the LNB so that output signals provided by the LNB to the at least one television receiver over a coaxial cable are formatted according to a band-translation mode or channel-stacking mode.

3. The method of claim 1, further comprising modifying logic of the LNB so that output signals provided by the LNB to the at least one television receiver over a coaxial cable are formatted according to a double-band band-translation mode.

4. The method of claim 1, further comprising modifying logic of the LNB so that output signals provided by the LNB to the at least one television receiver over a coaxial cable are formatted according to a triple-band band-translation mode.

5. The method of claim 1, further comprising modifying logic of the LNB so that output signals provided by the LNB to the at least one television receiver over a coaxial cable are formatted according to a channel-stacking mode.

6. The method of claim 1, further comprising modifying logic of the LNB so that output signals provided by the LNB to the at least one television receiver are formatted according to a polarity band granularity filtering mode, wherein a polarity band is about 500 MHz in band width.

7. The method of claim 1, further comprising modifying logic of the LNB so that output signals provided by the LNB to the at least one television receiver are formatted according to a transponder band granularity filtering mode, wherein a transponder band is about 30 MHz in band width.

8. The method of claim 1, further comprising modifying logic of the LNB so that the LNB sources channels of a particular band width to the at least one television receiver.

9. The method of claim 1, further comprising identifying by the LNB a particular configuration of the at least one television receiver in response to detection of connection of the LNB to the at least one television receiver.

10. The method of claim 1, further comprising further comprising identifying by the LNB a particular configuration of the at least one television receiver in response to detection of an instruction based on user-input to identify the particular configuration.

11. A computer-implemented method, comprising:
receiving a command, at a block downconverter from a communicatively coupled television receiver, to reprogram the block downconverter from a first mode to a second different mode so that the block downconverter is reconfigured to output signals to the television receiver formatted according to a sourcing scheme or mode of the television receiver as identified in the command;
modifying one or more logical modules of the block downconverter from a first configuration to a second different configuration so that output signals provided by the block downconverter to the television receiver are formatted according to the sourcing scheme or mode of the television receiver; and
outputting signals from the block downconverter to the television receiver formatted according to the sourcing scheme or mode of the television receiver.

12. The method of claim 11, further comprising modifying the one or logical modules so that output signals provided by the block downconverter to the television receiver are formatted according to a band-translation mode or channel-stacking mode.

13. The method of claim 11, further comprising modifying the one or logical modules so that output signals provided by the block downconverter to the television receiver are formatted according to a double-band band-translation mode.

14. The method of claim 11, further comprising modifying the one or logical modules so that output signals provided by the block downconverter to the television receiver are formatted according to a triple-band band-translation mode.

15. The method of claim 11, further comprising modifying the one or logical modules so that output signals provided by the block downconverter to the television receiver are formatted according to a channel-stacking mode.

16. The method of claim 11, further comprising receiving the command from the television receiver.

17. The method of claim 11, further comprising receiving the command from a system or device other than the television receiver.

18. A low-noise block downconverter, comprising:
at least one input module configured to include a plurality of input ports each communicatively couplable to a feedhorn to receive as input signals broadcast by a particular satellite;
at least one output module coupled to an input stage and configured to include a plurality of output ports each communicatively couplable to a particular television receiver to supply as output signals in accordance with a television receiver sourcing scheme or mode; and
at least one controller coupled to at least the output module and configured to receive a command from a communicatively coupled television receiver to program the output module so that output signals supplied to each plurality of output ports are formatted according to a sourcing scheme or mode of the television receiver as identified in the command.

19. The low-noise block downconverter of claim 18, wherein the controller is configured to receive a command from each of a plurality of television receivers to program an output stage so that output signals supplied to each of the plurality of output ports are formatted according to a sourcing scheme or mode of each individual television receiver of the plurality as identified in the received commands.

20. The low-noise block downconverter of claim 18, wherein the controller is configured to receive a command to program an output stage so that output signals supplied to at least one of the output ports is formatted according to a sourcing scheme or mode of a first television receiver, and so that output signals supplied to at least one other of the output ports is formatted according to a different sourcing scheme or mode of a second television receiver.

* * * * *